United States Patent Office 2,924,019
Patented Feb. 9, 1960

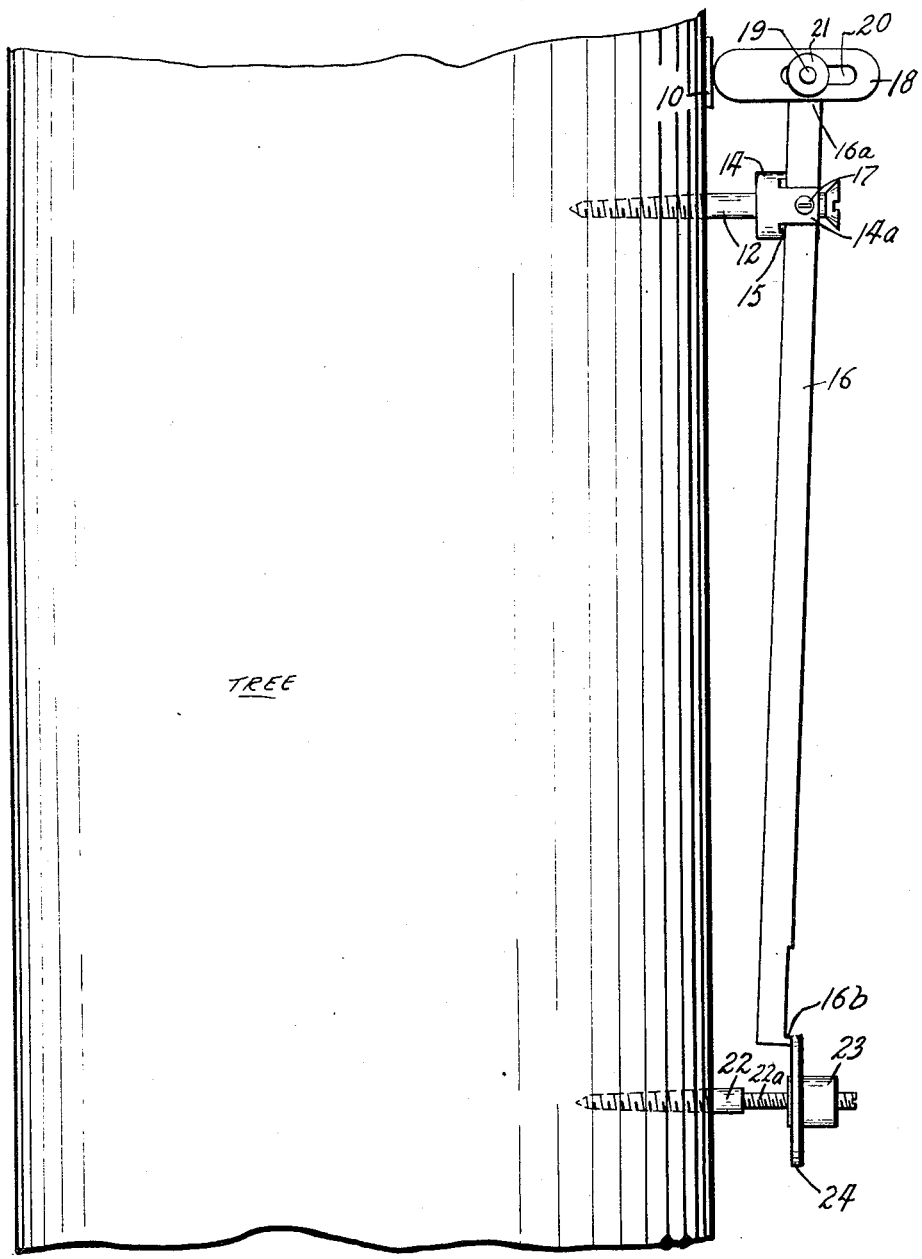

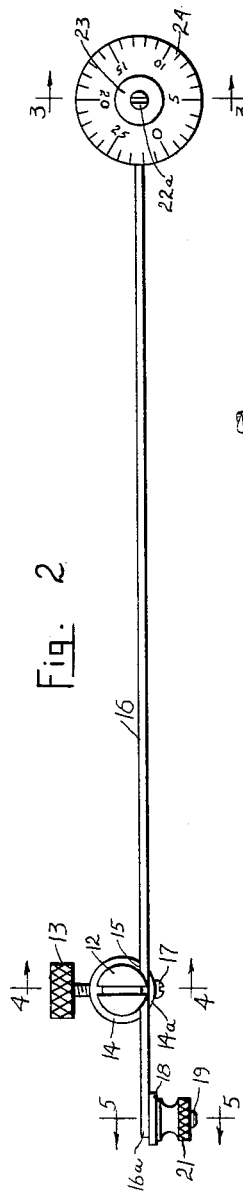
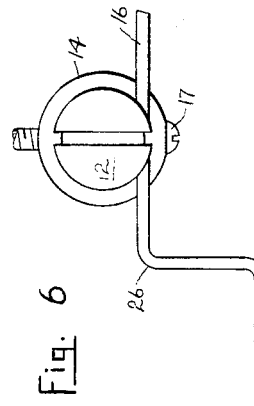
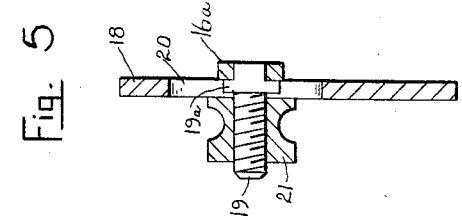
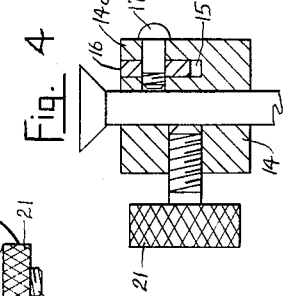
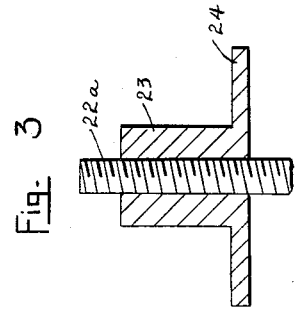
INVENTOR.
LEIF VERNER

2,924,019

METHOD AND APPARATUS FOR MEASUREMENT OF RADIAL GROWTH OF TREES

Leif Verner, Moscow, Idaho, assignor to University of Idaho Research Foundation Inc., Moscow, Idaho, a corporation of Idaho Application December 12, 1958, Serial No. 779,945

4 Claims. (Cl. 33—170)

This invention relates to an improvement in a method and apparatus for measuring the growth of trees. In the growing of trees, either in orchards where the crop harvested is the fruit, or in forests where the crop harvested is the whole tree, there is need for a simple way of measuring rate of growth frequently. For example, in orchards that are irrigated I have found that by recording each day, the growth of a number of representative trees in an orchard and plotting the daily averages as a graph, it was easy to detect any decrease in the growth rate by the change in direction of the curve. The beginning of an abatement in growth was found to correspond to a need for irrigation. With my instrument it is an easy matter to determine when to irrigate the orchard. At present the time to irrigate is either determined by the judgement of the grower or by soil moisture tests which are laborious and expensive.

It is the purpose of my invention to provide a simple reliable measuring apparatus that may be attached to a tree with a minimum of delay and that can be read and reset quickly. In order to understand the problems involved in tree growth measurement, the nature of tree growth must be considered. There is not a continuous uninterrupted increase in the radius of a tree trunk even during the period of most active growth in early summer. The radius of the tree is modified by true growth. It is simultaneously modified by alternate shrinking and swelling due to different degrees of hydration of the tissues. During the day water loss through the leaves may exceed water intake through the roots. During the night intake may exceed the loss. Generally the tree trunk shrinks during the day and swells during the night. By accurate measurement it has been found that, generally, shrinking of the trunk takes place from about daylight until mid afternoon, when the rate of shrinkage begins to diminish. About 6:00 or 7:00 p.m. the trunk begins to expand and continues to do so until shortly before daylight. If the maximum radius of the tree on a given day during the growing season is not greater than that on the preceding day, this indicates a lack of moisture and the tree should be irrigated.

The nature and advantages of my invention will appear more fully from the following description and the accompanying drawings illustrating a preferred form of the invention and the best mode of practicing it. It should be understood, however, that minor changes may be made from the exact structure shown and described without departing from the scope of the invention as defined in the claims.

In the drawings:

Figure 1 is a side view of a tree trunk showing my improved measuring apparatus applied thereto;

Figure 2 is a side view of the dendrometer taken at right angles to Figure 1;

Figure 3 is an enlarged sectional view taken on the line 3—3 of Figure 2;

Figure 4 is an enlarged sectional view taken on the line 4—4 of Figure 2;

Figure 5 is an enlarged sectional view taken on the line 5—5 of Figure 2; and

Figure 6 is a fragmentary side view showing a modification.

Referring now to the drawings, my improved measuring apparatus uses a small pad 10 of light gauge zinc plate which is fastened to the bark of the tree with water proof glue. This plate 10 provides a firm smooth surface against which to place that part of the instrument which is to be activated by the radial growth of the tree.

An indicator means is mounted on the tree trunk by means of a wood screw 12 which is screwed into the wood far enough (at least 1½ inches) to enter non-growing woody tissue of the tree and thus not move outward as the radius of the tree increases. A metal block 14 is placed on the screw 12 before the screw is placed in the tree. This block is locked to the screw 12 by a set screw 13 or some equivalent means so that it can be released when the screw 12 is being placed in a tree or removed from it. The block 14 has a slot 15 in its adapted to receive an indicator lever 16. A pivot pin 17 is threaded into the block 14 and pivotally mounts the lever 16 in the slot 15. The pin 17 also acts to draw the outer wall section 14a of the block 14 inward to grip the lever 16 lightly so that there is enough frictional opposition to movement of the lever 16 to hold it fixed except when it is moved.

At the upper end 16a of the lever 16, a short bar 18 is secured. This bar 18 is used to engage the plate 10 and transmit radial movement of the plate 10 to the upper end 16a of the lever 16. The bar 18 is adjustably secured to the lever end 16a by a screw threaded pin 19 set in the lever 16, a slot 20 in the bar 18 elongated lengthwise of the bar, and a knurled clamping nut 21 threaded on the pin 19. The pin 19 has a oblong portion 19a in the slot 20 to keep the bar 18 from turning.

It is evident that if the tree expands radially (as it does in growing), with the bar 18 pressing against the plate 10 and fixed to the lever end 16a, the lever will be found to turn on the pivot pin 17. This must happen because the screw 12 is fixed to the inner non-growing wood of the tree.

Measurement of the amount of movement of the lever 16 is accomplished by providing below the screw 12, a second screw 22, which is also set in the tree about 1½ inches so as to enter the non-growing inner wood of the tree and be held there. The screw 22 has an accurately threaded extension 22a which receives a threaded head 23. The head 23 has a radial flange 24 formed thereon and graduated with an indicating scale as shown in Figure 2. The lever 16 has an outwardly facing contact portion 16b adapted to engage the flange 24. It will be noted that the length of the lever 16 below the pivot pin 17 is several times the length of the portion between the pivot pin 17 and the threaded pin 19. Therefore the movement of the contact portion 16b will be several times the movement of the bar 18 and pin 19. Small changes in the tree diameter can thus be measured.

In certain types of trees the wounds made by inserting the screws 12 and 22 will exude a sap or pitch. For these installations I provide the modification shown in Figure 6 wherein the upper end 16a of the lever 16 is bent laterally as indicated at 26 to offset the pin 19 and the bar 18 so that the plate 10 can be placed out of a vertical path of the exuded material which may modify the radius both above and below the point of insertion of the screw 12.

This measuring apparatus enables a grower of trees to maintain an accurate record of tree growth by taking readings at desired intervals. He can make the readings at any time. Therefore he can work during daylight hours and obtain accurate indications of the maximum size reached by the tree since the last reading.

When the instrument is put into operation, the contact bar 18 is engaged with the plate 10. The head 23 is adjusted on the screw 22 until the contact portion 16b of the lever 16 is engaged by the inner face of the flange 24. The setting of the head 23 is made by noting and recording the mark on the flange 24 that aligns with the lever 16. The instrument is left until the next reading time which may be the next day, or several days later, depending on how closely the growth is being watched.

As the tree changes in size any increase in radius will move the plate 10 out, but there will not be a corresponding movement of the screw 12 and the block 14 because the screw 12 is fixed in non-growing wood of the tree. Any outward movement of the plate 10 will press the contact bar 18 outwardly and cause the lever 16 to turn on the pivot pin 17. This moves the contact portion 16b of the lever 16 away from the inner face of the head 23. The shrinkage of the tree during daylight merely moves the plate 10 away from the end of the contact bar 18 without moving the lever 16.

When the grower makes the next reading, he turns the head 23 until contact is again established with the portion 16b. The new reading is shown by the mark on the flange 24 that is aligned with the lever 16. The instrument is ready in this new position to indicate the growth during the succeeding period of time. If more than one night is passed between successive readings, the instrument accumulates the growth indications. Each night, if additional growth takes place, the contact portion 16b will be moved farther away from the head 23. The amount of rotation of the head 23 necessary to again establish contact between it and the contact portion 16b will be a measure of the total growth since the last reading.

A convenient device for showing when contact is made between the head 23 and the portion 16b is a battery operated light, such as a flashlight, equipped with two leads, each having a spring closed clip at one end. One lead has the other end electrically connected to one terminal of the battery and the other lead has its other end electrically connected to one terminal of the lamp, the other lamp terminal being connected to the other battery terminal. By applying the clips to the screws 12 and 22, the lamp will be lighted when contact between the head 23 and the portion 16b is made. Such devices for indicating when a circuit is completed are well known and therefore it has not been shown in the drawings.

This improved measuring apparatus provides a measurable indication showing the maximum increase in the radius of the tree trunk reached since the last reading regardless of the time it was reached. This indication can be measured at a convenient time during the day. Regular readings provide a clear record showing how the growth varies. For irrigation purposes it indicates, by a slowing down of the growth, when it is time to furnish more water to the trees. The device is simple and inexpensive, and easy to install and maintain. It can be used on trees of any size.

Having described my invention, I claim:

1. A device for measuring tree growth comprising two spaced apart posts adapted to be set into non-growing wood of the tree, a pad adapted to be mounted on the growing surface of the tree adjacent to one of the posts and on the side thereof away from the other post, an indicating lever pivotally mounted on the first named post to swing in a plane substantially radial to the tree, said lever having a member thereon radially alined with the pad and engageable therewith, a measuring head threaded on the other post and having an indicating scale thereon, said head having a flat surface facing the tree, the lever having a contact portion positioned to engage the flat surface, and means on the first post frictionally opposing pivotal movement of the lever.

2. A device for measuring tree growth comprising two spaced apart posts adapted to be set into non-growing wood of the tree, a pad adapted to be mounted on the growing surface of the tree adjacent to one of the posts but spaced a much greater distance from the other post, an indicating lever pivotally mounted on the first named post to swing in a plane substantially radial to the tree, said lever having a member thereon radially alined with the pad and engageable therewith, a measuring head threaded on the other post and having an indicating scale thereon, said head having a flat surface facing radially of the tree, the lever having a contact portion positioned to engage the flat surface, and means on the first post frictionally opposing pivotal movement of the lever.

3. Means to measure growth of a tree comprising two screw threaded post insertible into the non-growing wood of the tree, a pad attachable to the tree surface, a lever pivoted to one post, an indicating scale member on the other post, means on said lever adjacent to one post engaging said pad and operable to move the lever in response to outward movement of the pad by growth of the tree, and a tip portion on said lever cooperating with the scale member on the other post to indicate the growth.

4. The method of measuring tree growth which comprises inserting into the tree at two vertically spaced points a pair of posts, anchoring the posts to the non-growing wood of the tree, securing a pad to the surface of the tree vertically spaced from one post a short distance and spaced from the other post a much greater distance, pivoting a lever to the first named post with means at one end thereof engaging the pad and the other end extending to the other post and measuring the movement of the lever with respect to the other post.

References Cited in the file of this patent

UNITED STATES PATENTS

| 380,797 | Haddow | Apr. 10, 1888 |

FOREIGN PATENTS

| 98,843 | Switzerland | Apr. 1, 1922 |
| 843,665 | France | Apr. 3, 1939 |
| 1,032,115 | France | Mar. 25, 1953 |